(No Model.)
W. MORRISON.
ELECTRODE FOR SECONDARY BATTERIES.
No. 464,676. Patented Dec. 8, 1891.
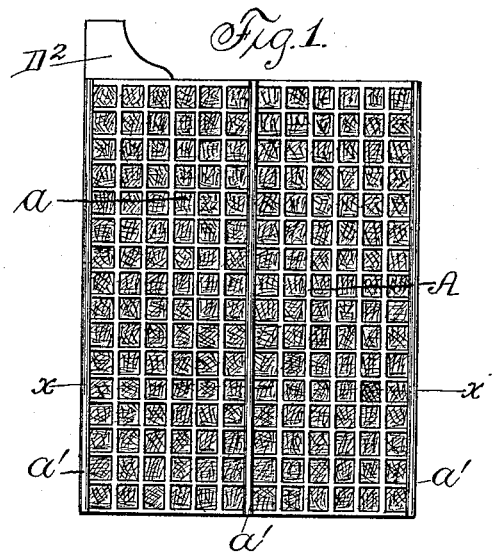
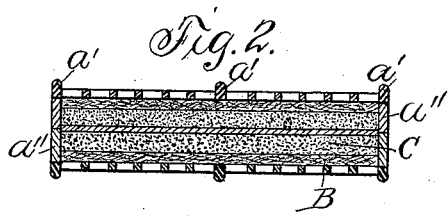
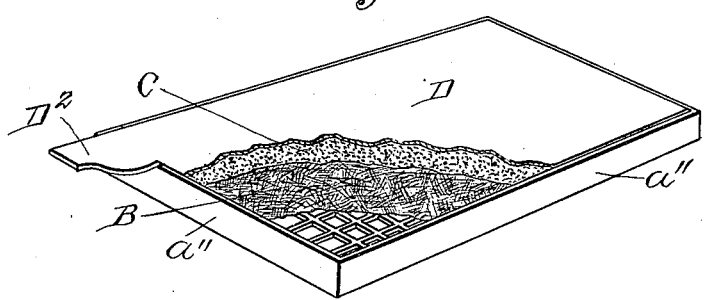
Witnesses:
M. P. Smith.
C. C. Bulkley.
Inventor:
William Morrison,
By Thomas G. Orwig, Atty.

United States Patent Office.

WILLIAM MORRISON, OF DES MOINES, IOWA, ASSIGNOR TO THE HESS ELECTRIC STORAGE BATTERY COMPANY, OF SAME PLACE.

ELECTRODE FOR SECONDARY BATTERIES.

SPECIFICATION forming part of Letters Patent No. 464,676, dated December 8, 1891.

Application filed October 27, 1890. Serial No. 369,524. (No model.)

*To all whom it may concern:*

Be it known that I, WILLIAM MORRISON, a citizen of the United States of America, residing at Des Moines, in the county of Polk and State of Iowa, have invented a new and useful Improvement in Electrodes for Storage-Batteries, of which the following is a specification.

Heretofore in the operation of the plates within the cells of a secondary battery difficulties have been encountered by reason of the breaking away of the oxides or other materials used in the composition of said plates, which materials, passing into the solutions, are precipitated upon the insulating-strips or the bottom of the cell, forming a conductor between the anodes, thus short-circuiting and setting up local action.

My object is to overcome these difficulties and to provide means by which the materials composing the plates shall be confined and held from passing into the solution, and yet at the same time to permit the free circulation of the gases or solution into and from the plates in the operative action of the battery, either in charging or discharging the same.

My object, further, is to accomplish the foregoing results by the use of a material which shall be practicably indestructible, not being subject to the attacks of the acids.

My invention consists in a covering, stratum, or layer of the material known to the trade as "glass-wool," which is made up of finely-divided fibers of glass or glass in a fibrous state, which is therefore highly porous, said glass-wool being placed or spread over the face of the active material or material to become active, and held thereon by any suitable means, the glass-wool being practicably indestructible, not being subject to the action of the acids, holding the active material or material to become active from entering the solution, and yet of such porosity as to freely permit the circulation of the gases and the solution.

My invention consists, further, in the construction of the plate shown and described in detail in the accompanying drawings, in which—

Figure 1 is a side view of the complete plate. Fig. 2 is a sectional view on the line $x\ x$, Fig. 1. Fig. 3 is a perspective view of one side of a plate, broken away to show the materials.

A designates a grid or outer confining-plate of rubber or other suitable material, which, as shown, has a multiplicity of perforations therein, (designated by $a$,) and also insulating-ridges $a'$. The said confining-plate A also has upturned flanges or edges $a''$ of the same material as the body of the plate, which extend about the edges thereof, being cut to permit the terminal of the conducting-plate, hereinafter to be described, to pass through to the exterior.

In carrying out my invention and constructing a completed electrode the glass-wool is spread over the confining plate or grid A within the flanges or edges $a''$, being designated by B. A layer or stratum of active material or material to become active is then spread over the glass-wool B, being indicated by the letter C, and a conducting-plate D, having an integral terminal $D^2$, then placed upon the said active material or material to become active. I form the other side of the completed electrode in the same manner, with the exception of the conducting-plate D, and thus another confining-plate A, with its contents, glass-wool, and active material or material to become active, is formed. This latter portion is then conjoined with the former part, producing a complete electrode, which may be bound together in any suitable manner or placed in a cell and bound by a number of electrodes. An electrode is therefore produced which has a central conducting-plate to which the leads are connected, and a layer of active material or material to become active on each side of the conducting-plate, and layers or strata of glass-wool interspersed between the outer confining-plates and the active material or material to become active, the wool and said material being held within the interior of the said confining-plates on each side. It is now obvious that the whole of the active material is practically exposed to the action of the solution, since the latter passes through the perforations of the confining-plates, and by means of the extreme porosity of the glass-wool is enabled to enter into and upon the material, no part of which latter is therefore inactive when the electrode is within the battery. At the same time, the glass-wool being finely divided, its pores or openings are so small that the active material is confined and held from passing out into the solution to set up local action, and yet there is a perfectly-free circulation of the gases and solution. The glass-wool being held against the face of the active material by means of the outer perforated confining-plates, a space is formed between each electrode when joined in couple within the cell, so that the hydrogen finds a ready means of escape to the surface of the solution, thus materially lessening the polarization. It is further obvious that the materials composing the plates are inclosed within a perforated confining-box, which entirely surrounds and incloses said materials, said box having an opening to permit the passage of the terminal. (Shown more clearly in Fig. 2, Fig. 3 disclosing but one part or side of a complete plate.)

I claim as my invention—

1. An electrode for secondary batteries, consisting of a stratum or body portion of active material or material to become active, and a layer, coating, or covering of fibrous glass-wool disposed upon the face or side of the body portion of active material, and perforated confining non-conducting plates of a material not subject to the action of the electricity or solution holding said glass-wool upon the face of the active material, as set forth.

2. An electrode for storage or secondary batteries, consisting of a stratum, layer, or body portion of active material or material to become active and layers, coverings, or coatings of glass-wool disposed upon the face of the said material, and perforated confining-plates having an insulating strip or strips which, when the plates are in couple, maintain a free space for the circulation of the liquid, as set forth.

3. An electrode for secondary batteries, consisting of outer confining perforated plates having ridges or upturned edges, a central conducting-plate, and layers or a body portion of active material or material to become active, together with an interposed layer or covering of fibrous glass-wool interposed between the faces of the active material and the outer confining-plates, as and for the purposes set forth.

4. An electrode for secondary batteries, consisting of outer confining perforated plates having ridges or upturned edges, which when joined form an inclosing box, a body portion of active material or material to become active, and coverings, coatings, or layers of glass-wool interposed between the body of active material and the outer perforated plates, said confining-plates serving as a box entirely surrounding the said active material, the glass-wool, and the conducting-plate, except the terminal thereof.

WILLIAM MORRISON.

Witnesses:
C. C. BULKLEY,
M. P. SMITH.